(12) United States Patent
  Takahashi

(10) Patent No.: US 12,287,439 B2
(45) Date of Patent: Apr. 29, 2025

(54) IMAGE CAPTURING APPARATUS AND DRIVE CIRCUIT FOR IMAGE CAPTURING APPARATUS

(71) Applicant: Sharp Display Technology Corporation, Kameyama (JP)

(72) Inventor: Kohzoh Takahashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 278 days.

(21) Appl. No.: 18/125,688

(22) Filed: Mar. 23, 2023

(65) Prior Publication Data
US 2023/0305175 A1   Sep. 28, 2023

(30) Foreign Application Priority Data
Mar. 28, 2022   (JP) ................. 2022-051795

(51) Int. Cl.
*G01T 1/24*   (2006.01)
(52) U.S. Cl.
CPC .................. *G01T 1/247* (2013.01)
(58) Field of Classification Search
None
See application file for complete search history.

(56) References Cited

U.S. PATENT DOCUMENTS

| | | |
|---|---|---|
| 2001/0012070 A1* | 8/2001 | Enod ............... H04N 25/00 348/304 |
| 2004/0178349 A1 | 9/2004 | Kameshima |
| 2005/0218333 A1 | 10/2005 | Kameshima |
| 2005/0269637 A1 | 12/2005 | Iwamatsu et al. |
| 2006/0054834 A1 | 3/2006 | Kameshima |
| 2007/0069144 A1 | 3/2007 | Kameshima |
| 2007/0257330 A1 | 11/2007 | Iwamatsu et al. |
| 2008/0061372 A1 | 3/2008 | Iwamatsu et al. |
| 2008/0067593 A1 | 3/2008 | Iwamatsu et al. |
| 2008/0128810 A1 | 6/2008 | Iwamatsu et al. |
| 2008/0128814 A1 | 6/2008 | Iwamatsu et al. |
| 2011/0221935 A1 | 9/2011 | Kameshima |

FOREIGN PATENT DOCUMENTS

JP   4564702 B2   10/2010

* cited by examiner

*Primary Examiner* — Edwin C Gunberg
(74) *Attorney, Agent, or Firm* — ScienBiziP, P.C.

(57) ABSTRACT

An X-ray image capturing apparatus includes a photoelectric conversion element, a TFT, a gate drive circuit, a control circuit, and a filter section. The TFT is connected to the photoelectric conversion element. The gate drive circuit supplies a gate signal to a gate electrode of the TFT. The control circuit supplies a control signal to the gate drive circuit. The filter section attenuates a component of the gate signal or the control signal that has a frequency lower than a prescribed frequency.

6 Claims, 4 Drawing Sheets

IMAGE CAPTURING APPARATUS AND DRIVE CIRCUIT FOR IMAGE CAPTURING APPARATUS

BACKGROUND

1. Field

The present disclosure relates to an image capturing apparatus and a drive circuit for an image capturing apparatus.

2. Description of the Related Art

In the related art, an image capturing apparatus including a thin film transistor and a drive circuit for an image capturing apparatus are known. Such an image capturing apparatus is disclosed in, for example, Japanese Patent No. 4564702.

Japanese Patent No. 4564702 discloses an X-ray image capturing apparatus including a thin film transistor. The X-ray image capturing apparatus includes a reference power supply circuit and a gate drive circuit. The reference power supply circuit applies a voltage to the gate drive circuit. The reference power supply circuit is provided with a regulator IC and a low-pass filter circuit. The low-pass filter circuit is disposed on an output side of the regulator IC, and attenuates high-frequency components in a voltage output from the regulator IC.

However, even in the X-ray image capturing apparatus disclosed in Japanese Patent No. 4564702, noise may not be sufficiently suppressed, and a streaky image may be generated on a captured image by an influence of the noise.

The present disclosure has been made in view of the above circumstances, and it is desirable to provide an image capturing apparatus and a drive circuit for an image capturing apparatus that can avoid the influence of noise on a captured image.

In order to address the above-mentioned problem, the inventor of the present application has conducted extensive studies and found that a control signal supplied to the gate drive circuit or a gate signal supplied to the thin film transistor contains a component having a frequency lower than a prescribed frequency, and that the component having a frequency lower than the prescribed frequency affects the captured image as noise.

SUMMARY

According to a first aspect of the present disclosure, there is provided an image capturing apparatus including: a photoelectric conversion element; a thin film transistor connected to the photoelectric conversion element; a gate drive circuit that supplies a gate signal to a gate electrode of the thin film transistor; a control circuit that supplies a control signal to the gate drive circuit; and a filter circuit that attenuates a component of the gate signal or the control signal that has a frequency lower than a prescribed frequency.

According to a second aspect of the present disclosure, there is provided a drive circuit for an image capturing apparatus including a photoelectric conversion element and a thin film transistor connected to the photoelectric conversion element, the drive circuit including: a gate drive circuit that supplies a gate signal to a gate electrode of the thin film transistor; a control circuit that supplies a control signal to the gate drive circuit; and a filter circuit that attenuates a component of the gate signal or the control signal that has a frequency lower than a prescribed frequency.

DESCRIPTION OF THE EMBODIMENTS

Figure 1:
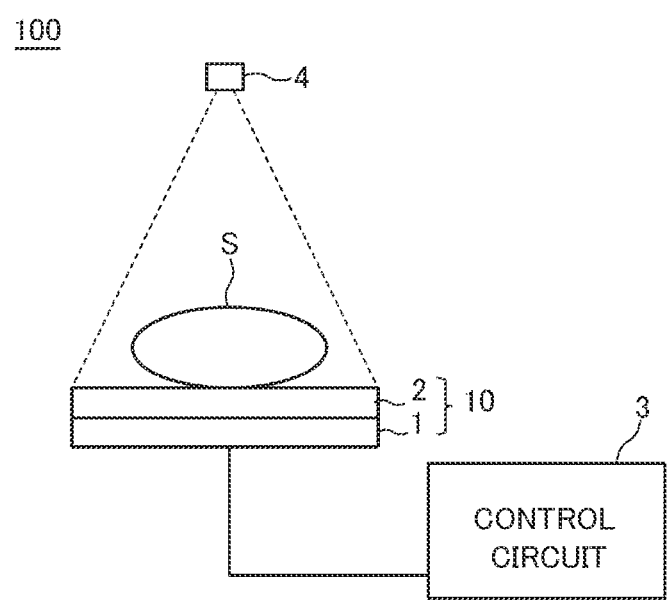
FIG. 1 is a schematic diagram showing an X-ray image capturing apparatus according to a first embodiment.

Hereinafter, embodiments of the present disclosure will be described based on the drawings. The present disclosure is not limited to the following embodiments, and design changes can be made as appropriate within the scope of satisfying a configuration of the present disclosure. In the following description, the same reference numerals are used for the same parts or parts having similar functions in common in different drawings, and the iteration description thereof will be omitted. In addition, each configuration described in the embodiments and modification examples may be appropriately combined or changed without departing from the gist of the present disclosure. In order to make the description easier to understand, in the drawings referred to below, the configuration is shown in a simplified or schematic form, or some constituent members are omitted. Dimensional ratios between the constituent members shown in each drawing do not necessarily indicate actual dimensional ratios.

First Embodiment

FIG. 1 is a schematic diagram showing an X-ray image capturing apparatus 100 according to a first embodiment. The X-ray image capturing apparatus 100 includes an X-ray imaging panel 10 including a photoelectric conversion panel 1 and a scintillator 2 superimposed on the photoelectric conversion panel 1. The X-ray image capturing apparatus 100 also includes a control circuit 3. An object S is irradiated with X-rays from an X-ray source 4. The X-rays transmitted through the object S are converted into fluorescence (hereinafter, referred to as scintillation light) by the scintillator 2 disposed on top of the photoelectric conversion panel 1. The X-ray image capturing apparatus 100 acquires an X-ray image with the control circuit 3 by imaging the scintillation light through the X-ray imaging panel 10.

Figure 2:
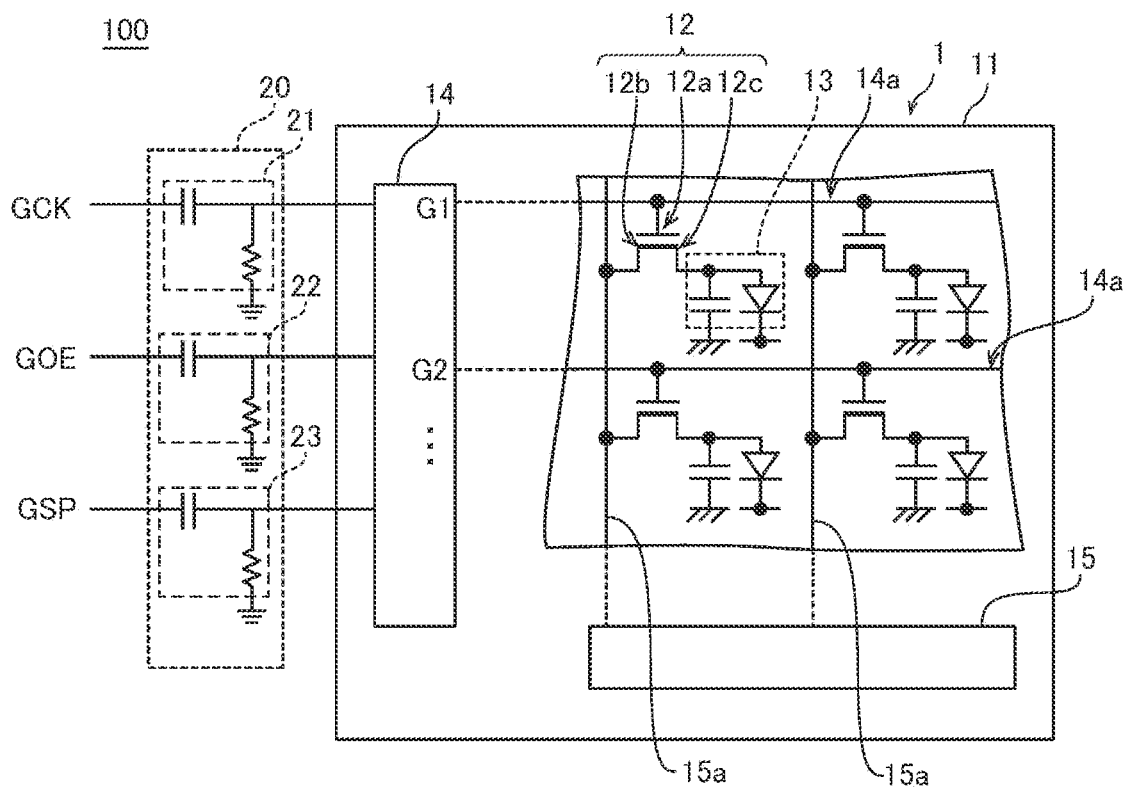
FIG. 2 is a schematic circuit diagram of the X-ray image capturing apparatus according to the first embodiment.

FIG. 2 is a schematic circuit diagram of the X-ray image capturing apparatus 100 according to the first embodiment. As shown in FIG. 2, the photoelectric conversion panel 1 includes a substrate 11. A thin film transistor (TFT) 12, a photoelectric conversion element 13, a gate drive circuit 14, and a data read-out circuit 15 are disposed on the substrate 11. The gate drive circuit 14 and the data read-out circuit 15 may each be configured as an integrated circuit (IC), or may be monolithically formed in the substrate 11 (integrated with the substrate 11). The photoelectric conversion element 13 is composed of, for example, a photodiode. The control circuit 3 is disposed on a substrate different from the substrate 11, for example, and is connected to the gate drive circuit 14 and the data read-out circuit 15 by a wire, a flexible printed circuit board, or the like.

A plurality of source wires 15a (data wires) and a plurality of gate wires 14a intersecting the plurality of source wires 15a are formed on the substrate 11. The gate wires 14a are connected to the gate drive circuit 14. The source wires 15a are connected to the data read-out circuit 15. The photoelectric conversion element 13 is provided in each of the regions (pixels) surrounded by the source wires 15a and the gate wires 14a. The photoelectric conversion panel 1 is provided with the TFT 12 connected to the source wire 15a and the gate wire 14a at a position where the source wire 15a and the gate wire 14a intersect each other. The photoelectric conversion element 13 converts the scintillation light into an electric charge corresponding to the amount of the light.

The gate drive circuit 14 outputs a gate signal (G1, G2, . . . ) to a gate electrode 12a of the TFT 12 based on a control signal output from the control circuit 3. The gate signal is sequentially output from the gate drive circuit 14 to each gate wire 14a in the photoelectric conversion panel 1. The TFT 12 includes the gate electrode 12a, a source electrode 12b, and a drain electrode 12c. The TFT 12 includes an In—Ga—Zn—O-based oxide semiconductor. Specifically, as an oxide semiconductor, $InGaO_3(ZnO)_5$, magnesium zinc oxide ($Mg_xZn_{1-x}O$), cadmium zinc oxide ($Cd_xZn_{1-x}O$), cadmium oxide (CdO), or an amorphous oxide semiconductor containing indium (In), gallium (Ga), and zinc (Zn) at a prescribed ratio may be used. The source electrode 12b is connected to the source wire 15a. The drain electrode 12c is connected to the photoelectric conversion element 13. When the gate signal is supplied to the gate electrode 12a, the TFT 12 is turned on. When the TFT 12 is turned on, a signal corresponding to the electric charge converted by the photoelectric conversion element 13 is output to the data read-out circuit 15 via the source wire 15a. The data read-out circuit 15 amplifies the signal corresponding to the electric charge converted by the photoelectric conversion element 13 and transmits the amplified signal to the control circuit 3. The control circuit 3 generates an X-ray captured image based on the signal acquired from the data read-out circuit 15.

Figure 3:
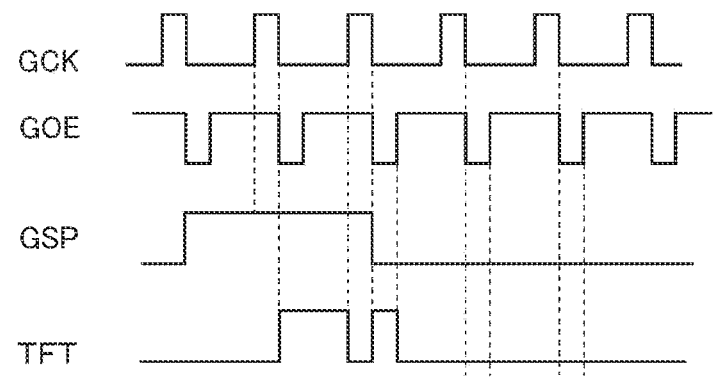
FIG. 3 is a timing chart showing an example of a control signal and an on/off timing of a TFT.

FIG. 3 is a timing chart showing an example of a control signal and an on/off timing of the TFT 12. As shown in FIGS. 2 and 3, the control circuit 3 outputs a gate clock signal GCK, a gate-output enable signal GOE, and a gate-start pulse signal GSP to the gate drive circuit 14 as control signals. The gate clock signal GCK is a signal that is in a high level at a fixed cycle. The gate-output enable signal GOE is a signal synchronized with the gate clock signal GCK, and is a signal for providing an instruction of an output timing of each of the gate signals (G1, G2, . . . ). The gate-start pulse signal GSP is a signal for informing the gate drive circuit 14 of the start of scanning. FIG. 3 shows an example in which the gate drive circuit 14 outputs the gate signal G1 to the TFT 12 and the TFT 12 is turned on when the gate-output enable signal GOE is enabled (Low level) after the gate-start pulse signal GSP is supplied. FIG. 3 is an example, and the combination of the control signals and the timing are not limited to this example.

Configuration of Filter Circuit

As shown in FIG. 2, in the first embodiment, the X-ray image capturing apparatus 100 includes a filter section 20 disposed on a transmission path (between the control circuit 3 and the gate drive circuit 14) of the control signal. The filter section 20 includes a first filter circuit 21, a second filter circuit 22, and a third filter circuit 23. The first filter circuit 21 is disposed on a transmission path of the gate clock signal GCK. The second filter circuit 22 is disposed on a transmission path of the gate-output enable signal GOE. The third filter circuit 23 is disposed on a transmission path of the gate-start pulse signal GSP. Each of the first filter circuit 21, the second filter circuit 22, and the third filter circuit 23 is configured as a high-pass filter circuit that passes a component of the control signal that has a frequency equal to or higher than a prescribed frequency and that attenuates a component having a frequency lower than the prescribed frequency. The term "prescribed frequency" refers to a cutoff frequency of the first filter circuit 21, the second filter circuit 22, and the third filter circuit 23. The "cutoff frequency" is, for example, a value based on a time constant of an RC circuit included in each of the first filter circuit 21, the second filter circuit 22, and the third filter circuit 23, as shown in FIG. 2. For example, the "cutoff frequency" can be set to 4 kHz, or may be set to a value other than 4 kHz, depending on the specifications of the X-ray image capturing apparatus 100 or the environment in which the X-ray image capturing apparatus 100 is disposed. For example, a resistance value and a capacitance of the RC circuit of each of the first filter circuit 21, the second filter circuit 22, and the third filter circuit 23 are configured such that the attenuation of the frequency component of the noise is 40 dB or more and the attenuation of the frequency component of the signal is less than 1 dB.

According to the above configuration, since the component of the control signal that has a frequency lower than the cutoff frequency, which is a component of noise that affects the X-ray captured image, can be attenuated, the influence of the noise on the X-ray captured image can be avoided. In particular, the generation of a streak image on the X-ray captured image by the influence of the noise is suppressed. In addition, according to the first embodiment, since the filter section 20 does not have to be formed on the substrate 11 or the gate drive circuit 14, the filter section 20 can be easily disposed (mounted) in the X-ray image capturing apparatus 100.

Second Embodiment

Next, a configuration of an X-ray image capturing apparatus 200 according to a second embodiment will be described with reference to FIG. 4. The same reference numerals as in the first embodiment are used for the same configuration as in the first embodiment, and the description thereof will be omitted.

Figure 4:
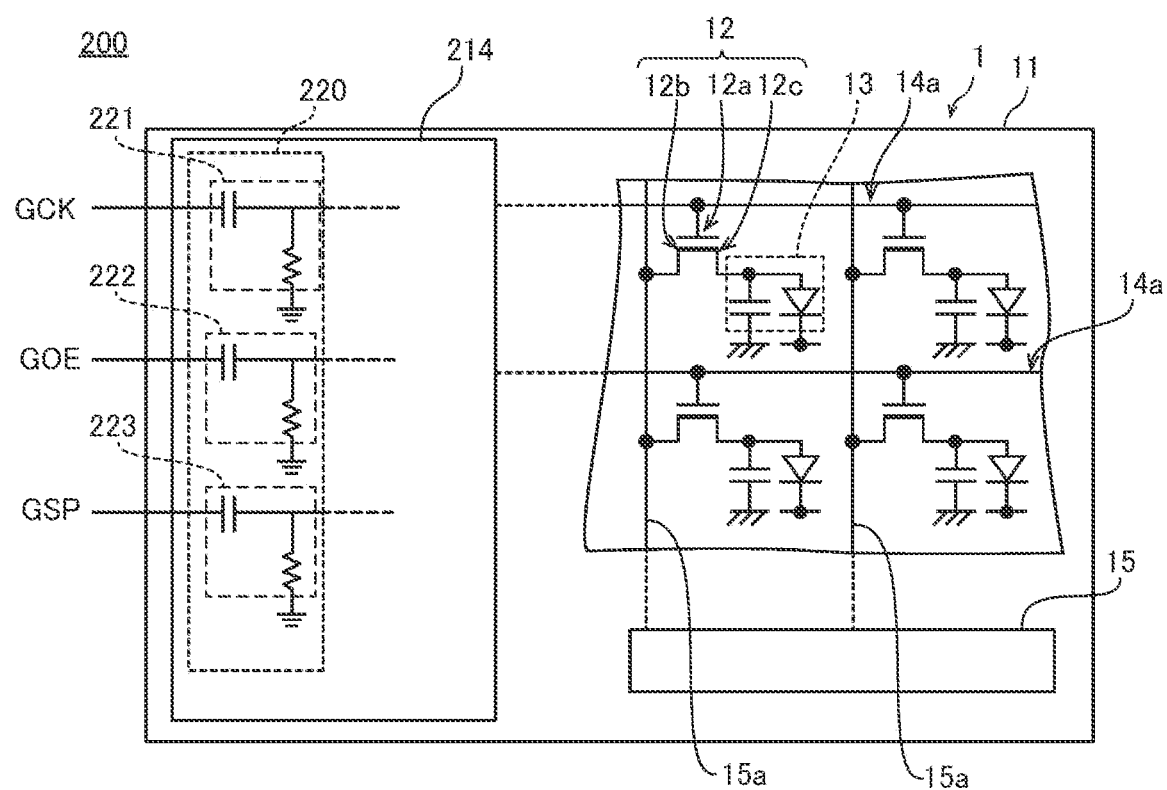
FIG. 4 is a diagram showing a configuration of an X-ray image capturing apparatus according to a second embodiment.

FIG. 4 is a diagram showing the configuration of the X-ray image capturing apparatus 200 according to the second embodiment. As shown in FIG. 4, the X-ray image capturing apparatus 200 includes a gate drive circuit 214 and a filter section 220. The filter section 220 is formed in the gate drive circuit 214. The gate drive circuit 214 is, for example, monolithically formed in the substrate 11 (integrated with the substrate 11). The filter section 220 is, for example, monolithically formed in the substrate 11 (integrated with the substrate 11). When the gate drive circuit 214 is configured as an integrated circuit, the filter section 220 is configured as a part of the integrated circuit. The filter section 220 includes a first filter circuit 221, a second filter circuit 222, and a third filter circuit 223. The first filter circuit 221 is disposed on a transmission path of the gate clock signal GCK. The second filter circuit 222 is disposed on a transmission path of the gate-output enable signal GOE. The third filter circuit 223 is disposed on a transmission path of the gate-start pulse signal GSP. The first filter circuit 221, the second filter circuit 222, and the third filter circuit 223 respectively function in the same manner as the first filter circuit 21, the second filter circuit 22, and the third filter circuit 23 according to the first embodiment. According to the second embodiment, since a substrate and mounting parts used for mounting the filter section 220 do not have to be provided separately from the substrate 11, the size and cost of the X-ray image capturing apparatus 200 can be reduced. Other configurations and effects are the same as those of the first embodiment.

Third Embodiment

Next, a configuration of an X-ray image capturing apparatus 300 according to a third embodiment will be described with reference to FIG. 5. The same reference numerals as in the first embodiment are used for the same configuration as in the first embodiment, and the description thereof will be omitted.

Figure 5:
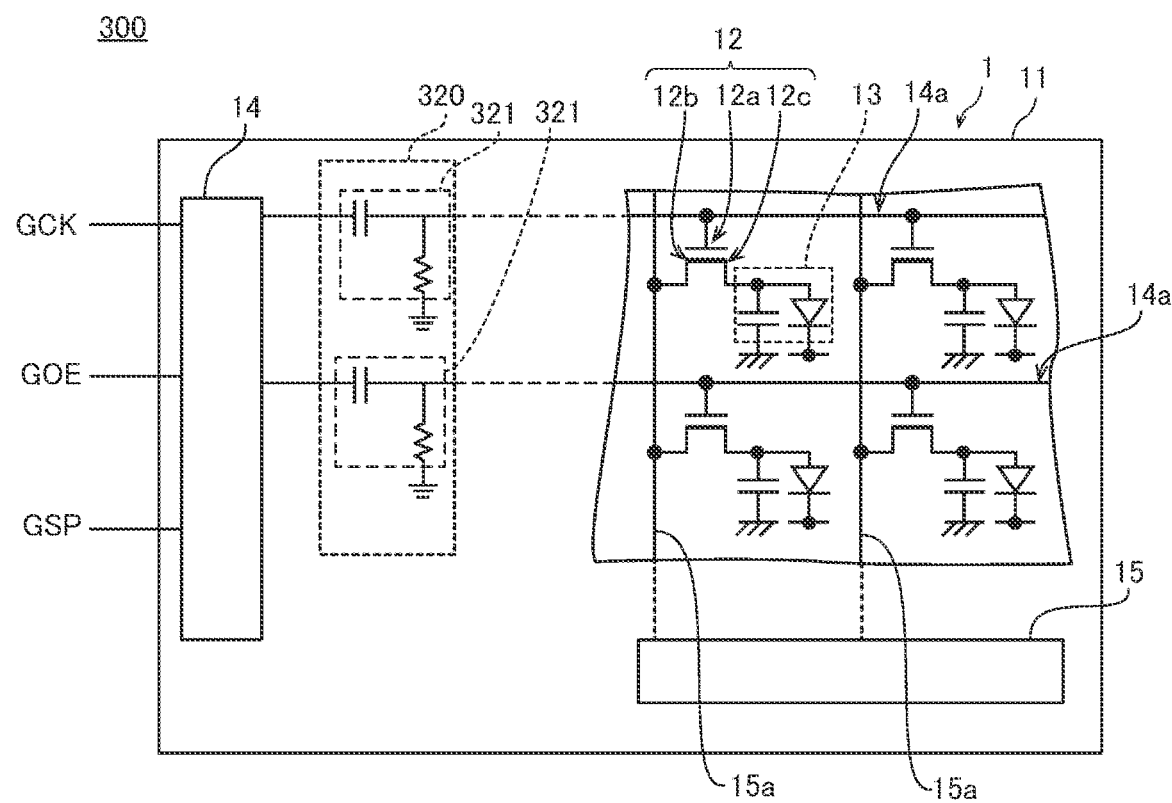
FIG. 5 is a diagram showing a configuration of an X-ray image capturing apparatus according to a third embodiment.

FIG. 5 is a diagram showing the configuration of the X-ray image capturing apparatus 300 according to the third embodiment. As shown in FIG. 5, the X-ray image capturing apparatus 300 includes a filter section 320. The filter section 320 includes a plurality of filter circuits 321. The plurality of filter circuits 321 are each disposed on corresponding one of the plurality of gate wires 14a. Each of the plurality of filter circuits 321 attenuates a component of the gate signal (G1, G2, . . . ) that has a frequency lower than the cutoff frequency and passes a component having a frequency equal to or higher than the cutoff frequency. Thereby, the noise component of the gate signal supplied via the plurality of gate wires 14a is attenuated. According to the third embodiment, since the filter circuit 321 is closer to the TFT 12 (pixel) than the filter circuit in the first or second embodiment is, noise that enters between the filter circuit 321 and the TFT 12 can be reduced. As a result, noise reaching the TFT 12 can be further reduced. Other configurations and effects are the same as those of the first or second embodiment.

Although the embodiments have been described above, the embodiments described above are merely an example for carrying out the present disclosure. Therefore, the present disclosure is not limited to the above-described embodiments, and it is possible to carry out the embodiments with appropriate modifications within a scope that does not deviate from the spirit of the present disclosure.

(1) In the first to third embodiments, an example in which the filter circuit is configured as the high-pass filter circuit has been described, but the present disclosure is not limited to this example. The filter circuit may be configured as a band-pass filter circuit. That is, the filter circuit may be configured by a circuit (for example, an LCR circuit) other than the RC circuit.

(2) In the first to third embodiments, an example in which the content of the present disclosure is configured as the X-ray image capturing apparatus has been described, but the present disclosure is not limited to this example. The content of the present disclosure may be applied to an image capturing apparatus that does not include a scintillator.

(3) In the first and second embodiments, an example in which the filter circuit is disposed on each of the transmission path of the gate clock signal, the transmission path of the gate-output enable signal, and the transmission path of the gate-start pulse signal has been described, but the present disclosure is not limited to this example. For example, the filter circuit may be disposed on at least one of the transmission path of the gate clock signal, the transmission path of the gate-output enable signal, and the transmission path of the gate-start pulse signal.

(4) In the third embodiment, an example in which the filter circuit is disposed on each of the plurality of gate wires has been described, but the present disclosure is not limited to this example. For example, the filter circuit may be disposed on at least one of the plurality of gate wires.

(5) In the first and second embodiments, an example in which the filter circuit is disposed only on the transmission path of the control signal has been described, and, in the third embodiment, an example in which the filter circuit is disposed only on the transmission path of the gate signal has been described, but the present disclosure is not limited to these examples. For example, the filter circuit may disposed on the transmission path of the control signal and the filter circuit may be disposed on the transmission path of the gate signal by combining the first or second embodiment with the third embodiment.

The image capturing apparatus and the drive circuit of the image capturing apparatus described above can also be described as follows.

An image capturing apparatus according to a first configuration includes: a photoelectric conversion element; a thin film transistor connected to the photoelectric conversion element; a gate drive circuit that supplies a gate signal to a gate electrode of the thin film transistor; a control circuit that supplies a control signal to the gate drive circuit; and a filter circuit that attenuates a component of the gate signal or the control signal that has a frequency lower than a prescribed frequency (first configuration).

According to the first configuration, it is possible to attenuate the component of the control signal that has a frequency lower than the prescribed frequency or the component of the gate signal that has a frequency lower than the prescribed frequency, which becomes noise affecting the captured image.

In the first configuration, the image capturing apparatus may further include a substrate on which the photoelectric conversion element, the thin film transistor, and the gate drive circuit are disposed, and the filter circuit may be disposed on a transmission path of the control signal from the control circuit to the gate drive circuit (second configuration).

When the filter circuit is disposed on the substrate or the gate drive circuit, a region for disposing the filter circuit is limited, but, according to the second configuration, the filter circuit does not have to be formed on the substrate or the gate drive circuit, so that it is possible to easily dispose the filter circuit in the image capturing apparatus.

In the first configuration, the filter circuit may be disposed in the gate drive circuit (third configuration).

According to the third configuration, a substrate and mounting parts used for mounting the filter circuit do not have to be separately provided, so that it is possible to reduce the size and cost of the image capturing apparatus.

In the second or third configuration, the control signal may include a gate clock signal, a gate-output enable signal, and a gate-start pulse signal, and the filter circuit may include a first filter circuit through which the gate clock signal passes, a second filter circuit through which the gate-output enable signal passes, and a third filter circuit through which the gate-start pulse signal passes (fourth configuration).

According to the fourth configuration, noise in the gate clock signal, the gate-output enable signal, and the gate-start pulse signal can be reduced, so that it is possible to further avoid the influence of noise on the captured image as compared with a case in which the filter circuit is provided only for a part of these signals.

In the first configuration, the filter circuit may be disposed on a transmission path of the gate signal from the gate drive circuit to the gate electrode (fifth configuration).

According to the fifth configuration, the filter circuit is closer to the thin film transistor (pixel) than in a case in which the filter circuit is provided on a control circuit side of the gate drive circuit, so that it is possible to reduce noise that enters between the filter circuit and the thin film transistor. As a result, noise reaching the thin film transistor can be further reduced.

A drive circuit for an image capturing apparatus according to a sixth configuration is a drive circuit for an image capturing apparatus including a photoelectric conversion element and a thin film transistor connected to the photoelectric conversion element, the drive circuit including: a gate drive circuit that supplies a gate signal to a gate electrode of the thin film transistor; a control circuit that supplies a control signal to the gate drive circuit; and a filter circuit that attenuates a component of the gate signal or the control signal that has a frequency lower than a prescribed frequency (sixth configuration).

According to the sixth configuration, it is possible to attenuate the component of the control signal that has a frequency lower than the prescribed frequency or the component of the gate signal that has a frequency lower than the prescribed frequency, which becomes noise affecting the captured image.

The present disclosure contains subject matter related to that disclosed in Japanese Priority Patent Application JP 2022-051795 filed in the Japan Patent Office on Mar. 28, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
    a photoelectric conversion element;
    a thin film transistor connected to the photoelectric conversion element;
    a gate drive circuit that supplies a gate signal to a gate electrode of the thin film transistor;
    a control circuit that supplies a control signal to the gate drive circuit; and
    a filter circuit that attenuates a component of the gate signal or the control signal that has a frequency lower than a prescribed frequency.

2. The image capturing apparatus according to claim 1, further comprising:
    a substrate on which the photoelectric conversion element, the thin film transistor, and the gate drive circuit are disposed,
    wherein the filter circuit is disposed on a transmission path of the control signal from the control circuit to the gate drive circuit.

3. The image capturing apparatus according to claim 1, wherein the filter circuit is disposed in the gate drive circuit.

4. The image capturing apparatus according to claim 2, wherein the control signal includes a gate clock signal, a gate-output enable signal, and a gate-start pulse signal, and
    the filter circuit includes
        a first filter circuit through which the gate clock signal passes,
        a second filter circuit through which the gate-output enable signal passes, and
        a third filter circuit through which the gate-start pulse signal passes.

5. The image capturing apparatus according to claim 1, wherein the filter circuit is disposed on a transmission path of the gate signal from the gate drive circuit to the gate electrode.

6. A drive circuit for an image capturing apparatus including a photoelectric conversion element and a thin film transistor connected to the photoelectric conversion element, the drive circuit comprising:
    a gate drive circuit that supplies a gate signal to a gate electrode of the thin film transistor;
    a control circuit that supplies a control signal to the gate drive circuit; and
    a filter circuit that attenuates a component of the gate signal or the control signal that has a frequency lower than a prescribed frequency.

* * * * *